United States Patent
Zhuang

(10) Patent No.: US 8,410,771 B2
(45) Date of Patent: Apr. 2, 2013

(54) METHOD AND APPARATUS FOR SPECTRUM DETECTION

(75) Inventor: Hongcheng Zhuang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 311 days.

(21) Appl. No.: 12/962,037

(22) Filed: Dec. 7, 2010

(65) Prior Publication Data

US 2011/0074387 A1 Mar. 31, 2011

Related U.S. Application Data

(63) Continuation of application No. PCT/CN2009/072021, filed on May 27, 2009.

(51) Int. Cl.
*G01R 23/00* (2006.01)
(52) U.S. Cl. .................... 324/76.19
(58) Field of Classification Search ............ 324/76.19, 324/762.01–762.1; 257/48; 438/14–18
See application file for complete search history.

(56) References Cited

U.S. PATENT DOCUMENTS

| | | | | |
|---|---|---|---|---|
| 4,801,873 | A * | 1/1989 | Takano | 324/76.12 |
| 6,621,277 | B2 * | 9/2003 | Mar | 324/622 |
| 6,979,993 | B2 * | 12/2005 | Kurosawa | 324/76.33 |
| 7,076,246 | B2 | 7/2006 | Chitrapu | |
| 7,289,972 | B2 | 10/2007 | Rieser et al. | |
| 7,418,245 | B2 | 8/2008 | Liu | |
| 2006/0062185 | A1 | 3/2006 | Darwood et al. | |
| 2007/0091720 | A1 | 4/2007 | Woo et al. | |
| 2008/0090581 | A1 | 4/2008 | Hu | |
| 2008/0165880 | A1 | 7/2008 | Hyon et al. | |
| 2008/0261639 | A1 | 10/2008 | Sun et al. | |

FOREIGN PATENT DOCUMENTS

| | | |
|---|---|---|
| CN | 1205140 A | 1/1999 |
| CN | 1708931 A | 12/2005 |
| CN | 101155423 | 4/2008 |
| CN | 101262288 | 9/2008 |
| CN | 101394207 | 3/2009 |
| CN | 101414865 A | 4/2009 |

OTHER PUBLICATIONS

Zhou Laixiu et al, "Collaborative Sensing Technology Based on Energy Detection and User Cooperation" Journal of Hunan City University (Natural Science), vol. 16, No. 2, Jun. 2007.
Xiang, Chun-gang, et al. "Cooperative Spectrum Sensing Scheme for Cognitive Radio Networks" Communications Technology, vol. 41, No. 9, 2008.
Zou, Yu-long, et al. "Detection probability analysis is of spectrum sensing through user cooperation," Journal of PLA University of Science and Technology, vol. 9, No. 6, Dec. 2008.
European Search Report issued in related EP 09845084.4 dated Oct. 5, 2011.

(Continued)

*Primary Examiner* — Tung X Nguyen
(74) *Attorney, Agent, or Firm* — Slater & Matsil, L.L.P.

(57) ABSTRACT

A spectrum detection method, system and base station are provided, which relate to the field of communications technology, and improve the spectrum utilization in a cellular multi-hop network. The spectrum detection method includes: receiving an intermediate spectrum detection result sent by each node; and integrating the intermediate spectrum detection results to obtain a final spectrum detection result. The spectrum detection method, system, and base station are mainly applied to cellular multi-hop networks.

15 Claims, 4 Drawing Sheets

OTHER PUBLICATIONS

Alemseged, Distributed spectrum sensing for cognitive radios, 2009 IEEE 69th Vehicular Technology Conf., Apr. 26-29, 2009, Barcelona Spain, IEEE, Apr. 26, 2009.

Qi, Weighted-Clustering Cooperative Spectrum Sensing in Cognitive Radio Context, Communications and Mobile Computing, 2009, CMC '09. WRI International Conf. IEEE, Jan. 6, 2009.

Written Opinion of the International Search Authority in PCT/CN2009/072021 dated Feb. 25, 2010.

International Search Report in PCT/CN2009/072021 dated May 27, 2009.

* cited by examiner

METHOD AND APPARATUS FOR SPECTRUM DETECTION

CROSS-REFERENCE TO RELATED APPLICATION

This application is a continuation of International Application No. PCT/CN2009/072021, filed on May 27, 2009, which is hereby incorporated by reference in its entirety.

FIELD OF THE TECHNOLOGY

The present invention relates to the field of communications technology, and more particularly to a spectrum detection method, system and base station.

BACKGROUND OF THE INVENTION

With the development of wireless broadband networks, radio spectrum resources are in urgent need, and cognitive radio (CR) technology is an important means of improving spectrum utilization. Base on the CR technology, a secondary system (unlicensed spectrum user) shares a spectrum with a primary system (licensed spectrum user) in opportunity mode, or with other secondary systems in a public spectrum according to certain spectrum etiquette. The key of spectrum sharing is that the secondary system can rapidly, accurately and reliably acquire status information of an idle spectrum. The acquisition of the status information is based on a spectrum sensing technique in the CR technology.

In actual applications, the spectrum sensing technique involves two key aspects: one is how to enable a CR user to obtain accurate detection information in a noise interference environment, and the other is how to reliably share or report the detection result with low overhead.

In a cellular multi-hop network, a terminal can be connected to a base station of a corresponding cell through one or more relay nodes, so as to reduce the path loss, and greatly increase the capacity and coverage of the entire cell. Therefore, with the increasing applications of cellular multi-hop networks, it is a problem to be addressed by researchers to improve the spectrum utilization in the cellular multi-hop network.

SUMMARY OF THE INVENTION

Accordingly, the present invention is directed to a spectrum detection method, system and base station, so as to improve the spectrum utilization in a cellular multi-hop network.

In an embodiment, the present invention provides a spectrum detection method, which includes the following steps.

An intermediate spectrum detection result sent by each node is received. The nodes include a cooperative detection non-relay node and a cooperative detection relay node.

The intermediate spectrum detection results are integrated to obtain a final spectrum detection result.

If the cooperative detection non-relay node performs spectrum detection and determines that the cooperative detection non-relay node is capable of reporting a detection result, the intermediate spectrum detection results include a first spectrum detection result of the cooperative detection non-relay node and a second spectrum detection result of the cooperative detection relay node.

If the cooperative detection non-relay node performs spectrum detection, but is not capable of determining the detection result, and relays a detection signal to the cooperative detection relay node, the intermediate spectrum detection results include the second spectrum detection result of the cooperative detection relay node.

If the cooperative detection non-relay node performs spectrum detection, is capable of determining the detection result, but is not capable of reporting the detection result, the intermediate spectrum detection results include one of: the second spectrum detection result of the cooperative detection relay node; the first spectrum detection result relayed by the cooperative detection non-relay node and reported by the cooperative detection relay node; and the second spectrum detection result of the cooperative detection relay node and the first spectrum detection result relayed by the cooperative detection non-relay node.

In an embodiment, the present invention provides a base station, which includes a result receiving unit and a result processing unit.

The result receiving unit is configured to receive an intermediate spectrum detection result sent by a cooperative detection non-relay node and a cooperative detection relay node.

The result processing unit is configured to integrate the intermediate spectrum detection results to obtain a final spectrum detection result.

If the cooperative detection non-relay node performs spectrum detection and determines that the cooperative detection non-relay node is capable of reporting a detection result, the intermediate spectrum detection results include a first spectrum detection result of the cooperative detection non-relay node and a second spectrum detection result of the cooperative detection relay node.

If the cooperative detection non-relay node performs spectrum detection, but is not capable of determining the detection result, and relays a detection signal to the cooperative detection relay node, the intermediate spectrum detection results include the second spectrum detection result of the cooperative detection relay node.

If the cooperative detection non-relay node performs spectrum detection, is capable of determining the detection result, but is not capable of reporting the detection result, the intermediate spectrum detection results include one of: the second spectrum detection result of the cooperative detection relay node; the first spectrum detection result relayed by the cooperative detection non-relay node and reported by the cooperative detection relay node; and the second spectrum detection result of the cooperative detection relay node and the first spectrum detection result relayed by the cooperative detection non-relay node.

In an embodiment, the present invention provides a spectrum detection system, which includes at least one cooperative detection non-relay node, at least one cooperative detection relay node, and a base station.

The cooperative detection non-relay node is configured to perform spectrum detection in a first time slot. If the cooperative detection non-relay node is capable of obtaining a first spectrum detection result and is capable of reporting the first spectrum detection result, the cooperative detection non-relay node is configured to send the first spectrum detection result to the base station; if the cooperative detection non-relay node is capable of obtaining the first spectrum detection result but is not capable of reporting the first spectrum detection result, the cooperative detection non-relay node is configured to relay the first spectrum detection result to the cooperative detection relay node; if the cooperative detection non-relay node is not capable of obtaining the first spectrum detection result, the cooperative detection non-relay node is configured to relay a detection signal to the cooperative detection relay node.

The cooperative detection relay node is configured to perform spectrum detection in a second time slot, obtain a second spectrum detection result, and send the second spectrum detection result to the base station. If the cooperative detection non-relay node is capable of obtaining the first spectrum detection result but is not capable of reporting the first spectrum detection result, the cooperative detection relay node is configured to receive the first spectrum detection result relayed by the cooperative detection non-relay node, and send the first spectrum detection result to the base station or send the first spectrum detection result and the second spectrum detection result to the base station.

The base station is configured to integrate the received spectrum detection results to obtain a final spectrum detection result.

In the spectrum detection method, system and base station according to the embodiments of the present invention, the two-level spectrum detection is performed by the cooperative detection non-relay node and the cooperative detection relay node, and the base station integrates the results of the two-level spectrum detection to obtain the final spectrum detection result, so that the spectrum utilization in a cellular multi-hop network is improved, thereby effectively improving the overall spectrum detection performance.

BRIEF DESCRIPTION OF THE DRAWINGS

In order to make the technical solution under the present invention clearer, the accompanying drawings for illustrating the embodiments of the present invention or the prior art are outlined below. Evidently, the accompanying drawings are for the exemplary purpose only, and those skilled in the art can derive other drawings from such accompanying drawings without any creative effort.

DETAILED DESCRIPTION OF THE EMBODIMENTS

The following detailed description is directed to the technical solution of the present invention with reference to the accompanying drawings. However, the embodiments to be described are only part of, rather than all of, the embodiments of the present invention. All other embodiments, which can be derived by those skilled in the art from the embodiments given herein without any creative efforts, fall within the scope of the present invention.

Figure 1:
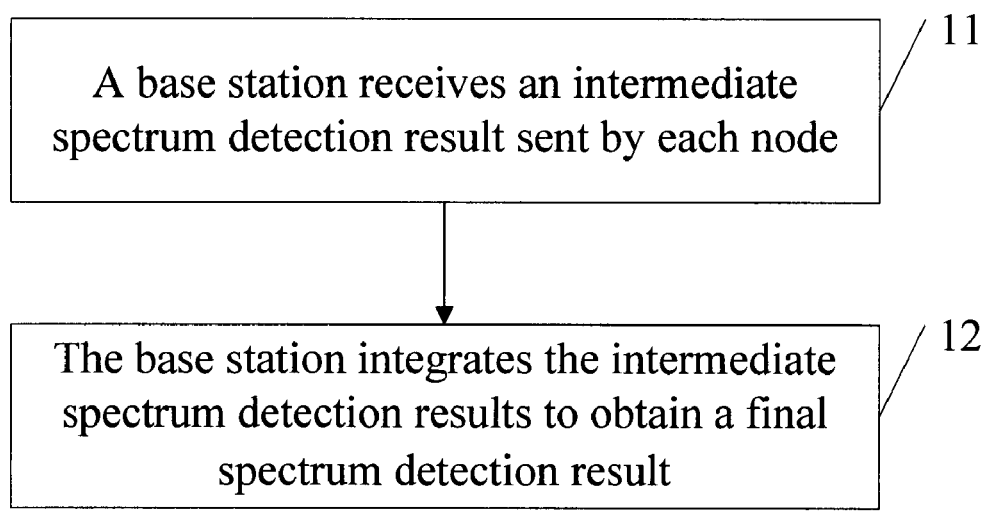
FIG. 1 is a flow chart of a spectrum detection method according to a first embodiment of the present invention.

In order to improve the spectrum utilization in a cellular multi-hop network, a spectrum detection method according to a first embodiment of the present invention introduces a hierarchical cooperative spectrum detection technology into the cellular multi-hop network, and meanwhile employs a data integration mechanism. As shown in FIG. 1, the method according to the first embodiment of the present invention includes the following steps.

In step 11, a base station receives an intermediate spectrum detection result sent by a cooperative detection non-relay node and a cooperative detection relay node.

In this embodiment, the intermediate spectrum detection results include the following three cases.

In case 1, if the cooperative detection non-relay node performs spectrum detection and determines that the cooperative detection non-relay node is capable of reporting a detection result, the intermediate spectrum detection results include a first spectrum detection result of the cooperative detection non-relay node and a second spectrum detection result of the cooperative detection relay node.

In case 2, if the cooperative detection non-relay node performs spectrum detection, is capable of determining the detection result, but is not capable of reporting the detection result, the intermediate spectrum detection results include: the second spectrum detection result of the cooperative detection relay node, or, the first spectrum detection result relayed by the cooperative detection non-relay node and reported by the cooperative detection relay node, or, the second spectrum detection result of the cooperative detection relay node and the first spectrum detection result relayed by the cooperative detection non-relay node.

In case 3, if the cooperative detection non-relay node performs spectrum detection, but is not capable of determining the detection result, and relays a detection signal to the cooperative detection relay node, the intermediate spectrum detection results include the second spectrum detection result of the cooperative detection relay node.

In step 12, the base station integrates the intermediate spectrum detection results to obtain a final spectrum detection result.

In this step, the base station integrates the intermediate spectrum detection results by combining the intermediate spectrum detection results. If at least K (K>=1, and K is an integer) intermediate spectrum detection results from N (N>=1, and N is an integer) intermediate spectrum detection results indicate that a spectrum is occupied, the final spectrum detection result is that the spectrum is occupied.

As can be seen from the method according to the first embodiment of the present invention, in the technical solution of this embodiment, the two-level spectrum detection is performed by the cooperative detection non-relay node and the cooperative detection relay node, and the base station integrates the results of the two-level spectrum detection to obtain the final spectrum detection result, so that the spectrum utilization in a cellular multi-hop network is improved, thereby effectively improving the overall spectrum detection performance.

The implementation process of the spectrum detection method according to the embodiment of the present invention is described in detail below with reference to a second embodiment.

In this embodiment, a CR system serves as a secondary system, and shares the spectrum with a primary system. Because the interference of the secondary user to the primary user needs to be prevented, the transmission power is generally limited, resulting in a limited coverage of a one-hop link. In order to enhance the application of the CR system, the multi-hop technology may be used, and at the same time, terminals are used as relay nodes so as to increase the coverage of the CR system. Considering that a plurality of CR users is spatially distributed at random, link transmission characteristics such as amplitude of fading of the CR users are not the same with the time, space and moving speed, and the occurrence of the primary user is also at random, primary user signals received by the CR users are not completely the same.

In the second embodiment of the present invention, cells of a CR base station are divided into a cluster-head region and a non-cluster-head region based on spatial locations, and a relay node capable of participating in cooperative detection, that is, a cooperative detection relay node is selected from the cluster-head region; then, the cooperative detection relay node and cooperative detection non-relay node perform hierarchical detection, and flexibly report detection results according to the detection condition and link status; finally, the base station integrates the detection results of the two levels.

Figure 2:
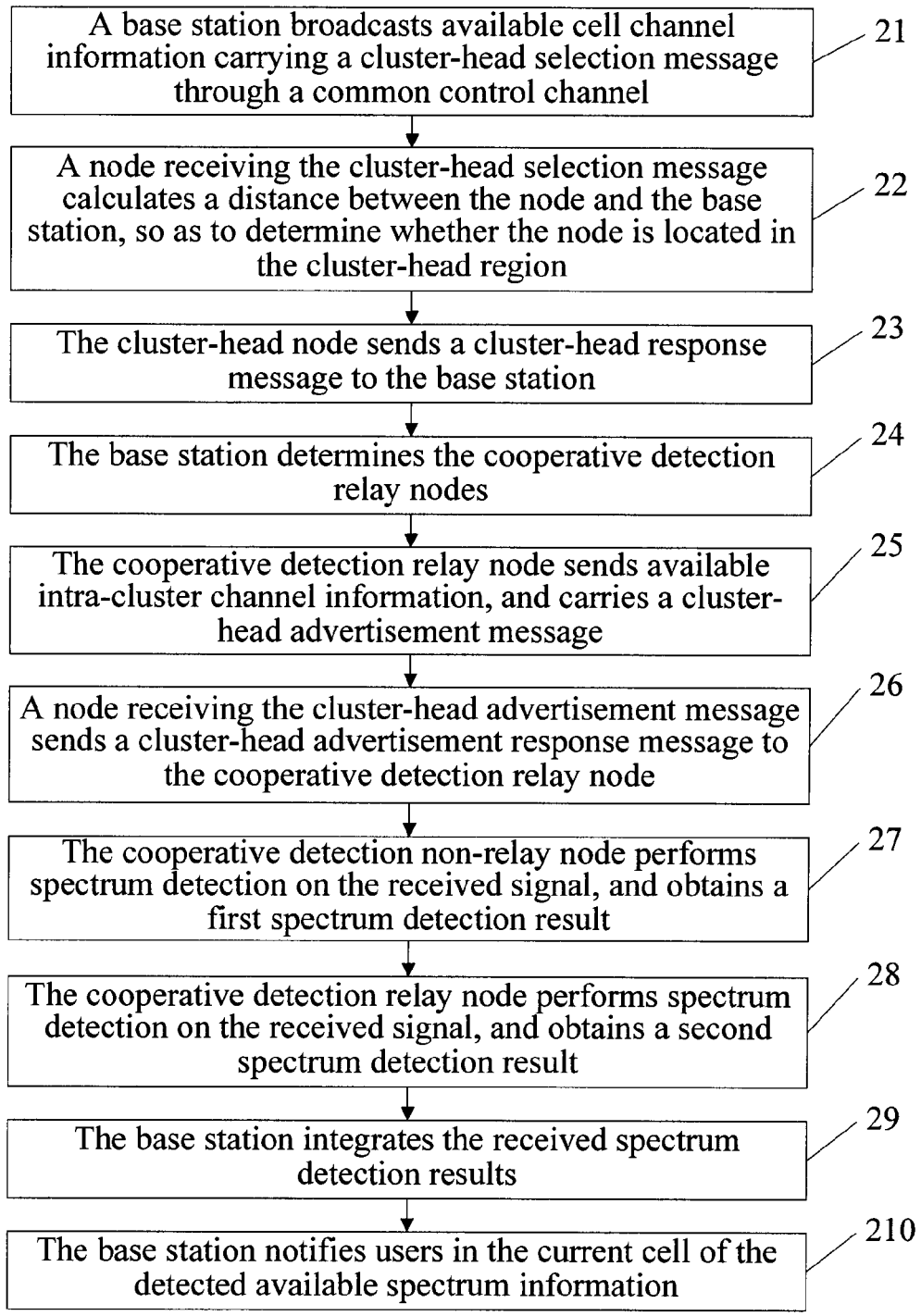
FIG. 2 is a flow chart of a spectrum detection method according to a second embodiment of the present invention.

As shown in FIG. 2, the spectrum detection method according to the second embodiment of the present invention includes the following steps.

In step 21, a base station broadcasts available cell channel information through a common control channel. The information carries a cluster-head selection message. The cluster-head selection message includes base station location, cell radius R, cluster-head threshold C, and detection parameters $\lambda_1$, $\lambda_2$, and D.

In the embodiment of the present invention, the detection parameters may be determined as follows.

(1) Determination of $\lambda_1$ and $\lambda_2$

Because the energy of the terminal is limited, a low-complexity energy detection method is adopted here, and the signal received by a CR user is expressed by the following formula:

$$x(t) = \begin{cases} n(t), & H_0 \\ hs(t) + n(t), & H_1 \end{cases}$$

Here, x(t) represents the signal received by a CR user, s(t) is a signal transmitted by a primary user, n(t) is additive white Gaussian noise, h is link gain, and $H_0$ and $H_1$ respectively indicate that the primary user is absent and present. If γ is used for representing the signal-to-noise ratio (SNR), after passing through an energy detector, distribution of Y with regard to the decision of $H_0$ or $H_1$ may be expressed as follows:

$$Y \sim \begin{cases} X^2_{2TW}, & H_0 \\ X^2_{2TW}(2\gamma), & H_1 \end{cases}$$

The detection statistics may be expressed as follows:

$$Y = (E_s + E_n) = \sum_{i=1}^{M} |x_i|^2 \underset{H_0}{\overset{H_1}{\gtrless}} \lambda$$

Here, sampling times M=2TW, T and W are respectively detection time and signal bandwidth, and $E_s$ and $E_n$ respectively represent the energy of the primary user signal and the energy of the noise.

In order to reduce the interference of the primary system, the secondary system needs to set a minimum detection probability $P_d^{Min}$; meanwhile, in order to fully utilize the spectrum, a maximum false alarm probability $P_f^{Max}$ needs to be set. Thereby, the detection parameters $\lambda_1$ and $\lambda_2$ can be calculated.

A decision threshold can be obtained according to the given maximum false alarm probability, that is, the detection parameter $\lambda_1$ can be obtained through the following formula:

$$P_f^{Max} = P(Y > \lambda_1 | H_0) = \frac{1}{2}\text{erfc}\left[\frac{\lambda_1 - 2TW}{2\sqrt{2}\sqrt{TW}}\right]$$

$$\text{erfc}(z) = \frac{2}{\sqrt{\pi}} \int_z^\infty \exp(-x^2) dx$$

The detection parameter $\lambda_2$ can be obtained according to the minimum detection probability:

$$P_d^{Min} = P(Y > \lambda_2 | H_1)$$
$$= \int_x Q_m(\sqrt{2\gamma} \sqrt{\lambda_2}) f_\gamma(x) dx$$

In the formula, $f_r(x)$ is distribution of the SNR, which depends on fading of the signal. If the primary signal undergoes shadow fading, the SNR is subject to log normal distribution; if the signal undergoes Rayleigh multi-path fading, the SNR is subject to exponential distribution.

In the formula, $Q_m(\ )$ is a Marcum Q-Function:

$$Q_m(a, b) = \int_b^\infty \frac{x^n}{a^{m-1}} e^{-\frac{x^2+a^2}{2}} I_{m-1}(ax) dx$$

Here, $I_{m-1}(\ )$ is an $(m-1)^{th}$ order modified Bessel function.

(2) Determination of the Detection Parameter D

In order to improve the accuracy of detection, the base station needs to make a correct decision, which not only requires the base station to obtain spectrum detection results of a plurality of independent terminals, but also requires the base station to fully utilize the dispersion of users in the system to improve the stability of cooperative performance. If terminals participating in cooperative detection are highly correlated, the performance of cooperative spectrum sensing may be greatly reduced.

A distance between nodes that realizes independence of channels can be obtained according to a channel-related parameter p, that is, the detection parameter D is:

$$p = \exp\left(-\frac{|\Delta d|}{d_{cor}} \ln 2\right)$$

$$D = |\Delta d| = -\frac{d_{cor} \ln p}{\ln 2}$$

Here, Δd is a distance between two nodes, and $d_{cor}$ is a minimum distance between the nodes that prevents correlation of channels.

In step 22, a node receiving the cluster-head selection message calculates a distance L between the node and the base station, so as to determine whether the node is located in the cluster-head region. If the distance L falls within a preset region, for example, [R/2,3R/4], it is determined that the node is located in the cluster-head region; otherwise, it is determined that the node is located in the non-cluster-head region. Here, the node located in the cluster-head region is referred to as a cluster-head node.

In step 23, if path loss $P_{Loss}$ and residual energy $E_{Rest}$ of the cluster-head node satisfies the following formula, the cluster-head node sends a cluster-head response message to the base station. The cluster-head response message carries residual energy and location information of the cluster-head node.

$$P_{loss}/E_{rest} < C$$

Here, $P_{loss}$ is the path loss, $E_{rest}$ is the residual energy, and C is the cluster-head threshold.

In step 24, the base station determines cooperative detection relay nodes according to the received cluster-head response message and the residual energy and location information reported by the cluster-head node, and sends a cluster-head confirmation message to the cooperative detection relay nodes.

All other nodes, including nodes in the cluster-head region other than the cooperative detection relay nodes and nodes in the non-cluster-head region may be considered as cooperative detection non-relay nodes.

If the cooperative detection relay nodes are determined, the nodes can be sorted according to the following formula:

$$\arg\min(P_{loss}^{\alpha}/E_{rest})$$

In the formula, $\alpha > 1$, is a system parameter, and indicates a weight of path loss.

As can be seen from the above formula, among all cluster-head nodes, the sorting principle is smallest path loss and largest residual energy.

Afterward, cooperative detection relay nodes are determined according to the sorting result and according to the detection parameter D and the distance $D_{ij}$ between the cluster-head nodes. Here, the number of cooperative detection relay nodes may be multiple. In specific applications, the cooperative detection relay nodes may be determined according to the sorting result through the following program segment.

It is assumed that $R_i$ represents an $i^{th}$ cluster-head node in a sorted order, i=1, 2, ..., N, S={$R_1$, $R_2$, ..., $R_N$} represents a cluster-head set, S' represents a set of cooperative detection relay nodes, $D_{ij}$ represents the distance between two cluster-head nodes, and D is a detection parameter:

for (i=1; i<=N-1; i++)

for (j=i+1; j<=N; j++)

if $D_{ij}$ > D, then

S' = S' ∪ $R_j$ ∪ $R_i$

In step 25, the cooperative detection relay node sends available intra-cluster channel information, and carries a cluster-head advertisement message. The cluster-head advertisement message preferably contains the detection parameters $\lambda_1$ and $\lambda_2$.

In step 26, a node receiving the cluster-head advertisement message records the information of the cooperative detection relay node, and sends a cluster-head advertisement response message to the cooperative detection relay node. The cluster-head advertisement response message carries residual energy and location information thereof.

Next, the cooperative detection relay node and the cooperative detection non-relay node perform hierarchical cooperative spectrum detection. The base station divides the detection time slot into two detection time slots, the cooperative detection non-relay node performs detection in a first detection time slot, and the cooperative detection relay node performs spectrum detection in a second detection time slot.

In addition, in the embodiment of the present invention, in order to improve the reliability of detection without increasing the overhead required for reporting the detection result, a soft hard decision mechanism is adopted in the detection process performed by the cooperative detection relay node and the cooperative detection non-relay node. Specific description is given below.

Signal energies obtained by the nodes through detection of the received signals are divided into three regions, namely, an energy region 1, an energy region 2, and an energy region 3. In the energy region 1, the signal energy is smaller than the detection parameter $\lambda_1$; in the energy region 2, the signal energy falls within an region [$\lambda_1$, $\lambda_2$]; in the energy region 3, the signal energy is greater than the detection parameter $\lambda_2$.

If a node detects that the signal energy falls within the energy region 2, it indicates that the node is not capable of determining the detection result. In this case, the cooperative detection non-relay node may relay the detection signal to the cooperative detection relay node or give up the detection, whereas the cooperative detection relay node may give up the detection or perform corresponding processing according to the detection signal or the detection result relayed by the cooperative detection non-relay node. This process may be described in detail if the cooperative detection relay node performs spectrum detection. If the signal energy falls within the energy region 1, it indicates that the spectrum is not occupied by the primary user, and each node reports a result 0; and if the signal energy falls within the energy region 3, it indicates that the spectrum is occupied by the primary user, and each node reports a result 1.

The spectrum detection process performed by the cooperative detection non-relay node and the cooperative detection relay node is described in the following.

In step 27, the cooperative detection non-relay node performs spectrum detection on the received signal, and obtains a first spectrum detection result.

Figure 3:
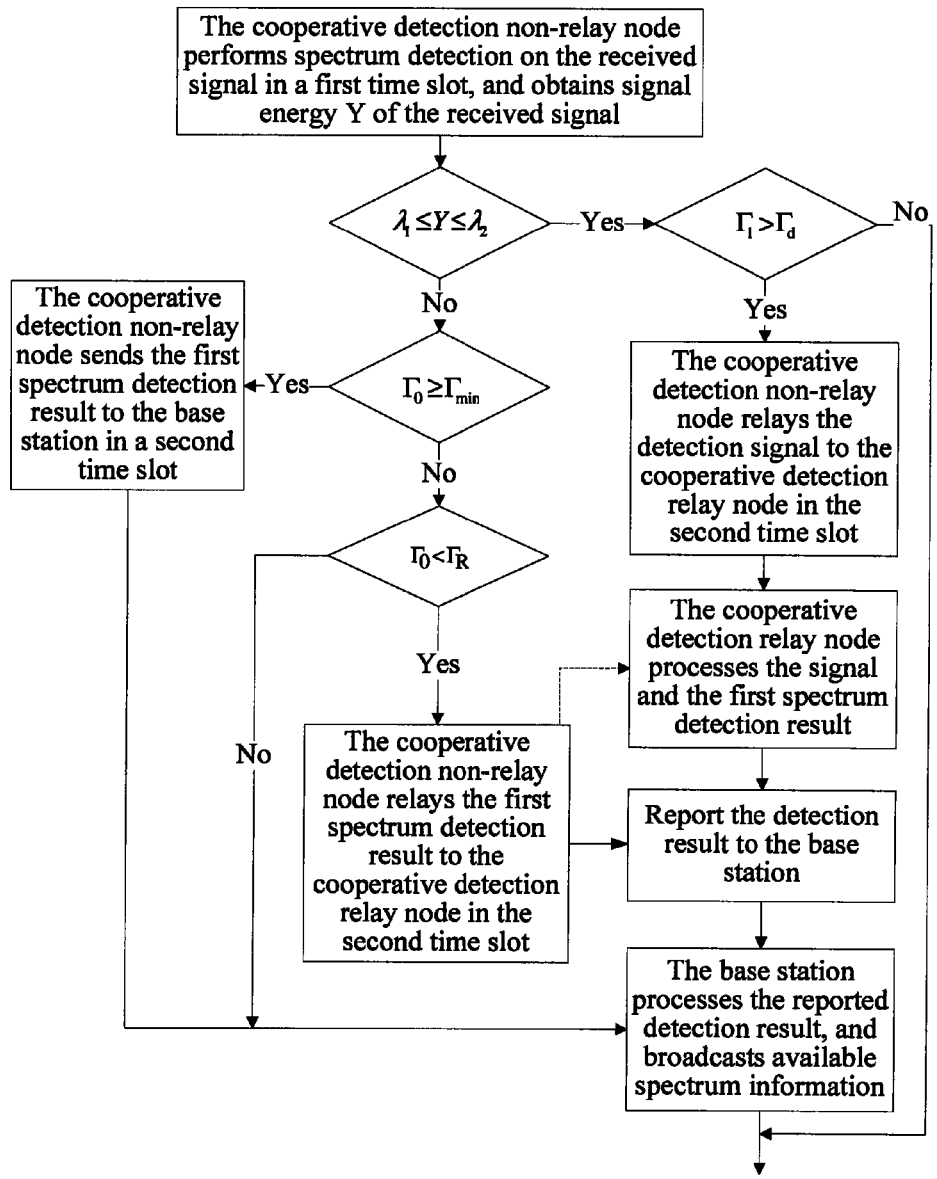
FIG. 3 is a flow chart of a detection process of a cooperative detection non-relay node and a cooperative detection relay node in the spectrum detection method according to the second embodiment of the present invention.

As shown in FIG. 3, after performing spectrum detection on the received signal, if the cooperative detection non-relay node detects, according to the soft hard decision mechanism described above, that the signal energy Y falls within the energy region 1 or the energy region 3, the cooperative detection non-relay node is capable of determining the detection result, and thus can obtain the first spectrum detection result.

After the cooperative detection non-relay node determines that the cooperative detection non-relay node is capable of determining the detection result, it is essential for the cooperative detection non-relay node to reliably report the first spectrum detection result.

It is assumed that the bit error ratio of the result reported by the system is $BER_{min}$, and the SNR of a corresponding link 15 $\Gamma_{min}$. The terminal may obtain a link status between the terminal and the base station, that is, SNR $\delta_0$, through channel estimation according to the available channel information broadcast by the base station or other system broadcast messages. Likewise, a link status between the terminal and the cooperative detection relay node, that is, SNR $\Gamma_1$, may also be obtained.

If $\Gamma_0 \geq \Gamma_{min}$, indicates that the cooperative detection non-relay node is capable of directly reporting the detection result thereof to the base station. Otherwise, it needs to judge whether a better result can be achieved by relay reporting. If $\Gamma_0 < \Gamma_R$, and $$\Gamma_R = \frac{\Gamma_1 \Gamma_2}{\Gamma_1 + \Gamma_2}$$

($\Gamma_1$ and $\Gamma_2$ respectively represent the SNR between the cooperative detection non-relay node and the cooperative detection relay node, and the SNR between the cooperative detection relay node and the base station), it indicates that relay reporting can improve the reliability of result reporting. Therefore, the cooperative detection non-relay node relays the first spectrum detection result thereof to the cooperative detection relay node, so that the cooperative detection relay node performs corresponding processing. Otherwise, the cooperative detection non-relay node gives up the detection result.

After performing spectrum detection on the received signal, if the cooperative detection non-relay node detects, according to the soft hard decision mechanism described above, that the signal energy Y falls within the energy region 2, the cooperative detection non-relay node is not capable of determining the detection result. In this case, if $\Gamma_0 \geq \Gamma_d$ ($\Gamma_d$ represents a detection threshold), the cooperative detection non-relay node relays the detection signal to the cooperative detection relay node, so that the cooperative detection relay node continues the detection.

In step 28, the cooperative detection relay node performs spectrum detection on the received signal, and obtains a second spectrum detection result.

As shown in FIG. 3, the cooperative detection relay node performs spectrum detection on the received signal in the second time slot, so as to obtain the second spectrum detection result. During the detection, an equal gain combining (EGC) method, a maximal ratio combining (MRC) method, a selective combining (SC) method or the like may be adopted. Considering the limitation of energy consumption of the terminal, the EGC method is described as an example in this embodiment.

The signal received by the cooperative detection relay node may be expressed by the following formula:

$$x(t) = h_p s(t) + \sum_{i=1}^{L} h_i h_{pi} s(t) + n(t)$$

Here, $h_p$, $h_{pi}$, and $h_i$ respectively represent channel gains between the cooperative detection relay node and the primary user, between the $i^{th}$ cooperative detection non-relay node and the primary user, and between the cooperative detection relay node and the $i^{th}$ terminal.

The cooperative detection relay node performs detection on the signal, and the signal energy obtained is:

$$Y = \left(|h_p|^2 + \sum_{i=1}^{L} |h_i h_{pi}|^2\right) E_s + E_n \begin{matrix} H_1 \\ > \lambda_2 \\ < \lambda_1 \\ H_0 \end{matrix}$$

Likewise, if the cooperative detection relay node detects, according to the soft hard decision mechanism described above, that the signal energy Y falls within the energy region 1 or the energy region 3 and considers that the detection result thereof is more reliable, the cooperative detection relay node reports the second spectrum detection result. If the cooperative detection relay node detects that the signal energy Y falls within the energy region 1 or the energy region 3 and considers that the detection result is not reliable, the cooperative detection relay node reports both the first spectrum detection result and the second spectrum detection result to the base station through a common channel. Alternatively, the cooperative detection relay node processes the first spectrum detection result and the second spectrum detection result to obtain a third spectrum detection result, and reports the third spectrum detection result to the base station through a common channel.

If it is detected that the signal energy Y falls within the energy region 2, it indicates that the cooperative detection relay node is not capable of determining the detection result, and in this case, the cooperative detection relay node performs reporting by considering the first spectrum detection result of the cooperative detection non-relay node. The specific reporting method may adopt an "or" principle, as expressed by the following formula:

$$S = \sum_{i=1}^{N} F_i,$$

In the formula, $F_i$ represents each first spectrum detection result, and as long as one value of $F_i$ is 1, S is 1. That is to say, as long as one cooperative detection non-relay node detects that the spectrum is occupied by the primary user, it indicates that the spectrum cannot be used in the current sector.

Alternatively, if the cooperative detection relay node is not capable of determining the detection result, the cooperative detection relay node directly forwards the first spectrum detection result from the cooperative detection non-relay node to the base station.

In step 29, the base station integrates the spectrum detection results from the cooperative detection non-relay node and/or the cooperative detection relay node.

In this step, a "K of N" principle is adopted, and the base station combines the received spectrum detection results, as expressed by the following formula:

$$B = \begin{cases} H_1, & \sum_{i=1}^{N} S_i \geq K \\ H_0, & \text{rest} \end{cases}$$

In the formula, $S_i$ represents the spectrum detection results reported by the cooperative detection non-relay node and the cooperative detection relay node. The formula shows that if any K detection results in N spectrum detection results reported are "1", it indicates that K detection nodes in N detection nodes detect that the spectrum is occupied by the primary user. Therefore, the base station judges that the spectrum is occupied by the primary user in the current cell, and cannot be used; otherwise, the spectrum is not occupied by the primary user and can be used.

In step 210, the base station broadcasts the detected available spectrum information through a common control channel, or carries the available spectrum information in other system broadcast messages, so as to notify users in the current cell of the spectrum that can be used in the cell.

It can be seen through the above steps that, in the method according to the embodiment of the present invention, if the cooperative detection relay nodes are determined, cluster division and cluster-head node selection are implemented at the same time. Therefore, the cluster-head nodes can receive the available channel information broadcast by the base station and the cooperative detection relay node. In order to further improve the spectrum utilization, the available spectrum may also be used at two levels.

Firstly, the base station categorizes the detection results into two types: one is an available spectrum in the cell, and the other is an available spectrum in a certain cluster region. Furthermore, the available channel information is broadcast based on cluster division, as shown in Table 1.

TABLE 1

| Cluster Region | Available Channel |
| --- | --- |
| Cluster Region 1 | F1, F2, F3, F4 ... |
| Cluster Region 2 | F5, F6, F3, F4 ... |
| Cluster Region 3 | F9, F10, F3, F4 ... |

Here, F3 and F4 are available bands in the cell, F1 and F2 represent available bands that can only be used in the cluster region 1, F5 and F6 represent available bands that can only be used in the cluster region 2, and F9 and F10 represent available bands that can only be used in the cluster region 3. If the base station performs spectrum allocation, available bands in the cell are preferentially used on a second-hop link and a direct link of the CR user.

According to the second spectrum detection result of the cooperative detection relay node and the available spectrum information of the base station, the cluster-head nodes preferentially use available channels in the current cluster for communication in the clusters, that is, on a first-hop link of the CR user. However, if a terminal using a certain channel detects the presence of the primary user, the terminal immediately stops occupying the spectrum, and reports to the cooperative detection relay node through a common control channel.

As can be seen from the method according to the second embodiment of the present invention, in the technical solution of this embodiment, through the two-level spectrum detection of the cooperative detection non-relay node and the cooperative detection relay node, the base station integrates the results of the two-level spectrum detection to obtain the final spectrum detection result, so that the spectrum utilization in a cellular multi-hop network is improved, thereby effectively improving the overall spectrum detection performance.

Persons of ordinary skill in the art should understand that all of or a part of processes in the method according to the embodiments may be implemented by a computer program instructing relevant hardware. The program may be stored in a computer readable storage media. If the program is executed, the processes of the method according to the embodiments of the present invention are performed. The storage media may be a magnetic disk, an optical disk, a read-only memory (ROM) or a random access memory (RAM).

Figure 4:
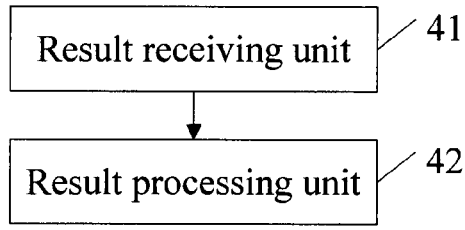
FIG. 4 is a schematic view of a base station according to a third embodiment of the present invention.

In addition, in a third embodiment, the present invention further provides a base station, which includes a result receiving unit 41 and a result processing unit 42, as shown in FIG. 4.

The result receiving unit 41 is configured to receive an intermediate spectrum detection result sent by each node.

The result processing unit 42 is configured to integrate the intermediate spectrum detection results to obtain a final spectrum detection result.

If the cooperative detection non-relay node performs spectrum detection and determines that the cooperative detection non-relay node is capable of reporting a detection result, the intermediate spectrum detection results include a first spectrum detection result of the cooperative detection non-relay node and a second spectrum detection result of the cooperative detection relay node.

If the cooperative detection non-relay node performs spectrum detection, but is not capable of determining the detection result, and relays a detection signal to the cooperative detection relay node, the intermediate spectrum detection results include the second spectrum detection result of the cooperative detection relay node.

If the cooperative detection non-relay node performs spectrum detection, is capable of determining the detection result, but is not capable of reporting the detection result, the intermediate spectrum detection results include one of: the second spectrum detection result of the cooperative detection relay node; the first spectrum detection result relayed by the cooperative detection non-relay node and reported by the cooperative detection relay node; and the second spectrum detection result of the cooperative detection relay node and the first spectrum detection result relayed by the cooperative detection non-relay node.

Figure 5:
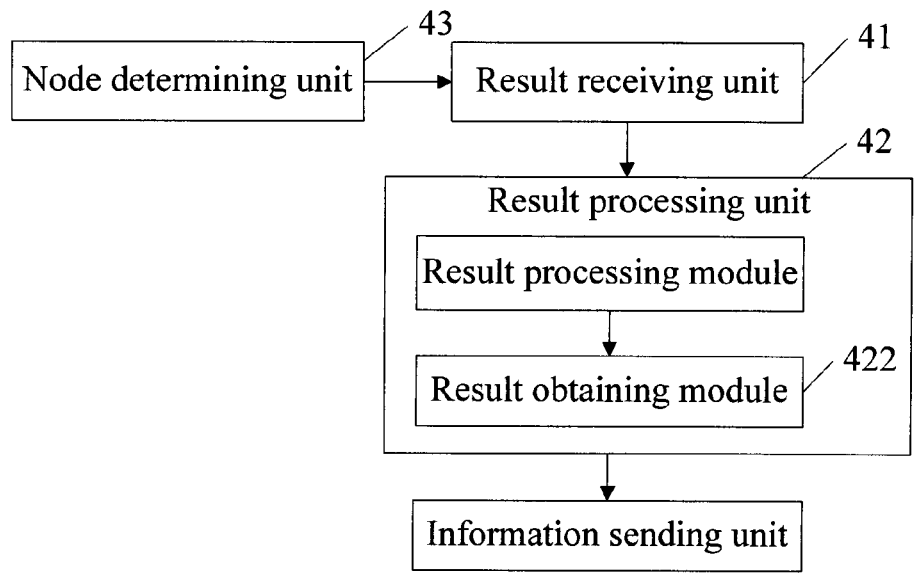
FIG. 5 is a structural diagram of the base station according to the third embodiment of the present invention.

As shown in FIG. 5, the result processing unit 42 may include a result processing module 421 and a result obtaining module 422.

The result processing module 421 is configured to combine the intermediate spectrum detection results. The result obtaining module 422 is configured to obtain the final spectrum detection result that a spectrum is occupied if at least one intermediate spectrum detection result in the intermediate spectrum detection results indicates that the spectrum is occupied.

In addition, in order to ensure the accuracy of spectrum detection, as shown in FIG. 5, the base station may further include a node determining unit 43 configured to determine the cooperative detection relay node. The node determining unit 43 determines the cooperative detection relay node in the same manner as that described in the second embodiment of the present invention.

In order to further improve the reliability of spectrum detection, the base station may further include an information sending unit 44 configured to broadcast available channel information to cluster-head nodes according to the final spectrum detection result, so that the cluster-head nodes preferentially use available channels in the cluster for communication in the clusters.

In the base station according to the third embodiment of the present invention, through the two-level spectrum detection of the cooperative detection non-relay node and the cooperative detection relay node, the results of the two-level spectrum detection are integrated to obtain the final spectrum detection result, so that the spectrum utilization in a cellular multi-hop network is improved, thereby effectively improving the overall spectrum detection performance.

Figure 6:
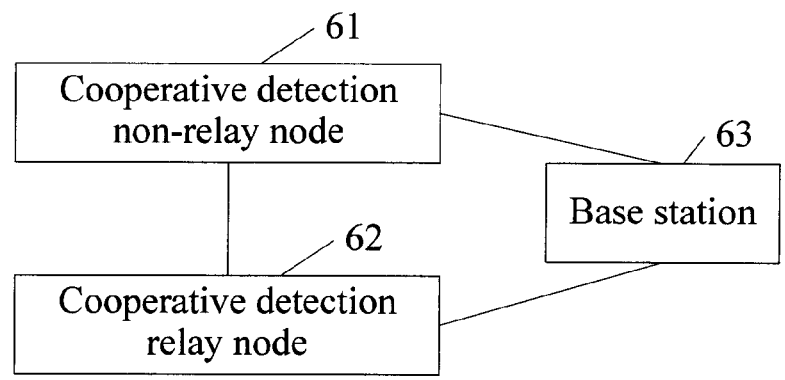
FIG. 6 is a schematic view of a spectrum detection system according to a fourth embodiment of the present invention.

As shown in FIG. 6, in a fourth embodiment, the present invention further provides a spectrum detection system, which includes at least one cooperative detection non-relay node 61, at least one cooperative detection relay node 62, and a base station 63.

The cooperative detection non-relay node 61 is configured to perform spectrum detection in a first time slot. If the cooperative detection non-relay node is capable of obtaining a first spectrum detection result and is capable of reporting the first spectrum detection result, the cooperative detection non-relay node is configured to send the first spectrum detection result to the base station; if the cooperative detection non-relay node is capable of obtaining the first spectrum detection result but is not capable of reporting the first spectrum detection result, the cooperative detection non-relay node is configured to relay the first spectrum detection result to the cooperative detection relay node; and if the cooperative detection non-relay node is not capable of obtaining the first spectrum detection result, the cooperative detection non-relay node is configured to relay a detection signal to the cooperative detection relay node.

The cooperative detection relay node 62 is configured to perform spectrum detection in a second time slot, obtain a second spectrum detection result, and send the second spectrum detection result to the base station. If the cooperative detection non-relay node is capable of obtaining the first spectrum detection result but is not capable of reporting the first spectrum detection result, the cooperative detection relay node is configured to receive the first spectrum detection result relayed by the cooperative detection non-relay node, and send the first spectrum detection result to the base station or send the first spectrum detection result and the second spectrum detection result to the base station.

The base station 63 is configured to integrate the received spectrum detection results to obtain a final spectrum detection result.

In addition, the cooperative detection relay node 62 is further configured to obtain a third spectrum detection result by processing the first spectrum detection result if the cooperative detection non-relay node performs spectrum detection, but is not capable of reporting the detection result, and relays the first spectrum detection result to the cooperative detection relay node. At this time, the base station 63 is further configured to obtain the final spectrum detection result according to the third spectrum detection result.

Based on the above, in the spectrum detection method, system and base station according to the embodiments of the present invention, through the two-level spectrum detection of the cooperative detection non-relay node and the cooperative detection relay node, the base station integrates the results of the two-level spectrum detection to obtain the final spectrum detection result, so that the spectrum utilization in a cellular multi-hop network is improved, thereby effectively improving the overall spectrum detection performance.

The present invention has been described by some preferred embodiments, but is not limited to those embodiments. Those skilled in the art may make various modifications and variations to the invention without departing from the spirit and scope of the invention. Therefore, the protection scope of the present invention is subject to the appended claims.

What is claimed is:

1. A method for spectrum detection, comprising:
receiving an intermediate spectrum detection result sent by a cooperative detection non-relay node and a cooperative detection relay node; and
integrating the intermediate spectrum detection results to obtain a final spectrum detection result;
wherein if the cooperative detection non-relay node performs spectrum detection and determines that the cooperative detection non-relay node is capable of reporting a detection result, the intermediate spectrum detection results comprise a first spectrum detection result of the cooperative detection non-relay node and a second spectrum detection result of the cooperative detection relay node;
if the cooperative detection non-relay node performs spectrum detection, but is not capable of determining the detection result, and relays a detection signal to the cooperative detection relay node, the intermediate spectrum detection results comprise the second spectrum detection result of the cooperative detection relay node; and
if the cooperative detection non-relay node performs spectrum detection, is capable of determining the detection result, but is not capable of reporting the detection result, the intermediate spectrum detection results comprise one of:
the second spectrum detection result of the cooperative detection relay node;
the first spectrum detection result relayed by the cooperative detection non-relay node and reported by the cooperative detection relay node; and
the second spectrum detection result of the cooperative detection relay node and the first spectrum detection result relayed by the cooperative detection non-relay node.

2. The method according to claim 1, wherein the intermediate spectrum detection results further comprise a third spectrum detection result, and the third spectrum detection result is obtained by the cooperative detection relay node processing the first spectrum detection result of the cooperative detection non-relay node if the cooperative detection non-relay node performs the spectrum detection, but is not capable of reporting the detection result, and relays the first spectrum detection result to the cooperative detection relay node.

3. The method according to claim 1, wherein before receiving the intermediate spectrum detection results, the method further comprises:
determining cooperative detection relay nodes.

4. The method according to claim 3, wherein the determining the cooperative detection relay nodes comprises:
sending a cluster-head selection message to each node, wherein the cluster-head selection message carries cluster-head selection parameters;
receiving cluster-head response messages from cluster-head nodes specified by the cluster-head selection parameters, wherein the cluster-head response messages carry residual energy and location parameters of the cluster-head nodes; and
determining the cooperative detection relay nodes from the cluster-head nodes according to the cluster-head response messages.

5. The method according to claim 4, further comprising:
sending, by the cooperative detection relay node, a cluster-head advertisement message carrying detection parameters.

6. The method according to claim 1, further comprising:
performing, by the cooperative detection non-relay node, the spectrum detection, and judging whether the cooperative detection non-relay node is capable of determining the detection result, comprising:
performing, by the cooperative detection non-relay node, the spectrum detection on a received signal in a first detection time slot, and obtaining the first spectrum detection result;
wherein if the first spectrum detection result falls within an energy report region, the cooperative detection non-relay node is capable of determining the detection result; if the first spectrum detection result does not fall within an energy report region, the cooperative detection non-relay node is not capable of determining the detection result.

7. The method according to claim 6, further comprising:
judging, by the cooperative detection non-relay node, whether the cooperative detection non-relay node is capable of reporting the detection result,
wherein if the cooperative detection non-relay node is capable of determining the detection result and if a link between the cooperative detection non-relay node and a base station satisfies a result reporting condition, it is determined that the cooperative detection non-relay node is capable of reporting the first spectrum detection result; if the cooperative detection non-relay node is capable of determining the detection result and if a link between the cooperative detection non-relay node and a base station does not satisfy a result reporting condition, it is determined that the cooperative detection non-relay node is not capable of reporting the first spectrum detection result.

8. The method according to claim 1, further comprising: performing, by the cooperative detection relay node, the spectrum detection on a received signal in a second detection time slot, and obtaining the second spectrum detection result;

wherein if the second spectrum detection result falls within an energy report region, the cooperative detection relay node reports the second spectrum detection result to a base station; and if the cooperative detection relay node receives the first spectrum detection result relayed by the cooperative detection non-relay node, and the second spectrum detection result falls within the energy report region, the cooperative detection relay node reports one of the following results to the base station:

the second spectrum detection result; the first spectrum detection result relayed by the cooperative detection non-relay node; the second spectrum detection result and the first spectrum detection result relayed by the cooperative detection non-relay node.

9. The method according to claim 1, wherein the integrating the intermediate spectrum detection results to obtain the final spectrum detection result comprises:

combining the intermediate spectrum detection results; and obtaining the final spectrum detection result that a spectrum is occupied if at least one intermediate spectrum detection result in the intermediate spectrum detection results indicates that the spectrum is occupied.

10. A base station, comprising:

a result receiving unit, configured to receive an intermediate spectrum detection result sent by a cooperative detection non-relay node and a cooperative detection relay node; and a result processing unit, configured to integrate the intermediate spectrum detection results to obtain a final spectrum detection result;

wherein if the cooperative detection non-relay node performs spectrum detection and determines that the cooperative detection non-relay node is capable of reporting a detection result, the intermediate spectrum detection results comprise a first spectrum detection result of the cooperative detection non-relay node and a second spectrum detection result of the cooperative detection relay node;

if the cooperative detection non-relay node performs spectrum detection, but is not capable of determining the detection result, and relays a detection signal to the cooperative detection relay node, the intermediate spectrum detection results comprise the second spectrum detection result of the cooperative detection relay node; and if the cooperative detection non-relay node performs spectrum detection, is capable of determining the detection result, but is not capable of reporting the detection result, the intermediate spectrum detection results comprise one of:

the second spectrum detection result of the cooperative detection relay node;

the first spectrum detection result relayed by the cooperative detection non-relay node and reported by the cooperative detection relay node; and the second spectrum detection result of the cooperative detection relay node and the first spectrum detection result relayed by the cooperative detection non-relay node.

11. The base station according to claim 10, wherein the result processing unit comprises:

a result processing module, configured to combine the intermediate spectrum detection results;

a result obtaining module, configured to obtain the final spectrum detection result that a spectrum is occupied if at least one intermediate spectrum detection result in the intermediate spectrum detection results indicates that the spectrum is occupied.

12. The base station according to claim 10, further comprising:

a node determining unit, configured to determine cooperative detection relay nodes.

13. The base station according to claim 12, further comprising:

an information sending unit, configured to broadcast available channel information to cluster-head nodes according to the final spectrum detection result.

14. A system for spectrum detection, comprising: at least one cooperative detection non-relay node, at least one cooperative detection relay node, and a base station, wherein the cooperative detection non-relay node is configured to perform spectrum detection in a first time slot; send the first spectrum detection result to the base station if the cooperative detection non-relay node is capable of obtaining a first spectrum detection result and is capable of reporting the first spectrum detection result; relay the first spectrum detection result to the cooperative detection relay node if the cooperative detection non-relay node is capable of obtaining the first spectrum detection result but is not capable of reporting the first spectrum detection result; and relay a detection signal to the cooperative detection relay node if the cooperative detection non-relay node is not capable of obtaining the first spectrum detection result;

the cooperative detection relay node is configured to perform spectrum detection in a second time slot, obtain a second spectrum detection result, and send the second spectrum detection result to the base station; if the cooperative detection non-relay node is capable of obtaining the first spectrum detection result but is not capable of reporting the first spectrum detection result, receive the first spectrum detection result relayed by the cooperative detection non-relay node, and send the first spectrum detection result to the base station or send the first spectrum detection result and the second spectrum detection result to the base station; and the base station is configured to integrate the received spectrum detection results to obtain a final spectrum detection result.

15. The system according to claim 14, wherein the cooperative detection relay node is further configured to obtain a third spectrum detection result by processing the first spectrum detection result if the cooperative detection non-relay node performs the spectrum detection, but is not capable of reporting the detection result, and relays the first spectrum detection result to the cooperative detection relay node; and the base station is further configured to obtain the final spectrum detection result according to the third spectrum detection result.

* * * * *